United States Patent
Todoroki et al.

(10) Patent No.: US 10,106,668 B2
(45) Date of Patent: Oct. 23, 2018

(54) SILICONE RUBBER COMPOSITION FOR MAKING KEY PAD AND KEY PAD

(71) Applicant: Shin-Etsu Chemical Co., Ltd., Tokyo (JP)

(72) Inventors: Daichi Todoroki, Annaka (JP); Minoru Igarashi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 15/597,723

(22) Filed: May 17, 2017

(65) Prior Publication Data

US 2017/0349726 A1    Dec. 7, 2017

(30) Foreign Application Priority Data

Jun. 6, 2016 (JP) .................. 2016-112644

(51) Int. Cl.

| | |
|---|---|
| C08K 5/11 | (2006.01) |
| C08K 3/36 | (2006.01) |
| C08K 3/24 | (2006.01) |
| C08K 5/05 | (2006.01) |
| C08K 5/101 | (2006.01) |
| C08K 5/14 | (2006.01) |
| C08K 5/5419 | (2006.01) |
| H01H 9/02 | (2006.01) |

(52) U.S. Cl.
CPC .................. *C08K 5/11* (2013.01); *C08K 3/24* (2013.01); *C08K 3/36* (2013.01); *C08K 5/05* (2013.01); *C08K 5/101* (2013.01); *C08K 5/14* (2013.01); *C08K 5/5419* (2013.01); *C08K 2201/006* (2013.01); *H01H 9/02* (2013.01)

(58) Field of Classification Search
CPC ............ C08G 77/20; C08K 3/36; C07F 7/182
See application file for complete search history.

(56) References Cited

U.S. PATENT DOCUMENTS 6,407,159 B2   6/2002  Sugimoto et al.
2005/0159522 A1* 7/2005  Bublewitz ............... C08L 83/04
                                                    524/430

FOREIGN PATENT DOCUMENTS

| JP | 2001-164111 A | 6/2001 |
| JP | 2009-275158 A | 11/2009 |
| JP | 2011-105782 A | 6/2011 |

* cited by examiner

*Primary Examiner* — Kuo Liang Peng
(74) *Attorney, Agent, or Firm* — Birch, Stewart, Kolasch & Birch, LLP

(57) ABSTRACT

Provided is a silicone rubber composition suited for use as a key pad having excellent dynamic fatigue durability (keying durability) and a silicone rubber key pad obtained by curing molding of the composition.

A silicone rubber composition for making a key pad includes:

(A) 100 parts by weight of an organopolysiloxane represented by the following average compositional formula (1):

$$R^1_n SiO_{(4-n)/2} \qquad (1)$$

wherein $R^1$ is each independently the same or different and are an unsubstituted or substituted monovalent hydrocarbon group, and letter n is a positive number of 1.95 to 2.04, and having at least two alkenyl groups in one molecule;

(B) 10 to 100 parts by weight of reinforcing silica having a specific surface area of at least 50 $m^2/g$ when determined by BET method;

(C) 0.1 to 10 parts by weight of a vinyl group-containing alkoxysilane;

(D) 0.0001 to 0.2 part by weight of hydrochloric acid, calculated as hydrogen chloride in hydrochloric acid;

(E) 0.01 to 5 parts by weight of a fatty acid ester and/or a fatty alcohol ester; and (F) an effective amount of a curing agent.

4 Claims, 2 Drawing Sheets

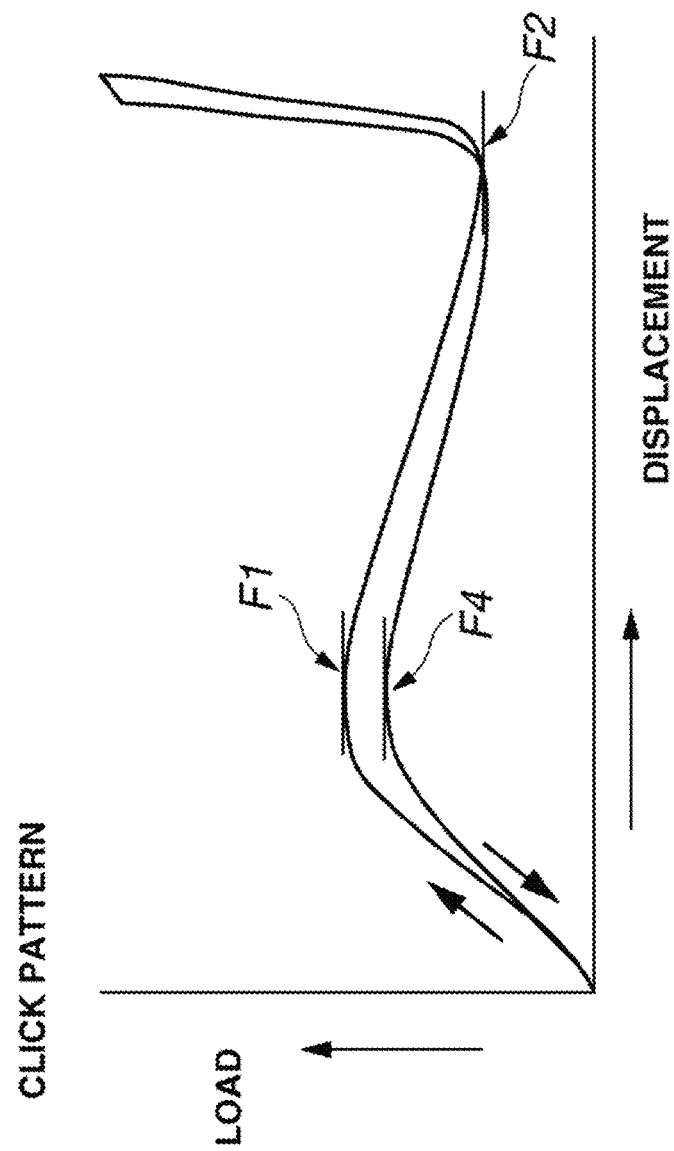

SILICONE RUBBER COMPOSITION FOR MAKING KEY PAD AND KEY PAD

CROSS-REFERENCE TO RELATED APPLICATION

This non-provisional application claims priority under 35 U.S.C. § 119(a) on Patent Application No. 2016-112644 filed in Japan on Jun. 6, 2016, the entire contents of which are hereby incorporated by reference.

TECHNICAL FIELD

The present invention relates to a silicone rubber composition which is excellent in dynamic fatigue durability and is suited as a key pad material, and also to a key pad obtained by curing molding of the composition.

BACKGROUND ART

Silicone rubber has excellent characteristics of weatherability, electric characteristics, a low compression set resistance, a heat resistance, a cold resistance and the like and has thus wide use in various fields including electric instruments, motor vehicles, construction, medical services and foods. For instance, examples of use applications include key pads used for rubber contact points of remote controllers, typewriters, word processors, computer terminals, musical instruments and the like, building gaskets, anti-vibration rubbers for audio devices and the like, vehicle parts such as connector seals and spark plug boots, packings for compact disks used in computers, and molds for breads and cakes. The demand for silicone rubber is now increasing more and more, and the development of silicone rubber having excellent characteristics has been demanded.

Of these, the key pad material has been in wide use such as for keyboards of cell phones and personal computers. The characteristics required for the key pad materials are those wherein when a key is pressed, a load variation is small. Usually, when a molded key is repeatedly pressed, the load of the key lowers as the number of the repetitions increases. A less lower of peak load leads to better key characteristics, and a material showing such a load characteristic as mentioned above is excellent as a key pad material.

Silicone rubber has been in wide use as such a key pad material. In JP-A 2001-164111 (Patent Document 1), a silicone rubber composition for key pad has been proposed.

In recent years, however, the strain exerted on the key becomes greater in association with a more complicated shape of a molded key. Moreover, the miniaturization of a recently employed device leads to an increasing number of shapes that need a greater strain exerted on material. Therefore, recent severe requirements would not be adequately satisfied with respect to dynamic fatigue durability.

In JP-A 2009-275158 (Patent Document 2), there has been proposed a silicone rubber composition suited as a key pad having excellent dynamic fatigue durability (keying durability) wherein there is used a phosphoric acid ester having an alkyl group, part of which is substituted with chlorine. Such a composition is not favorable because the keying durability is not satisfactory and a making device undergoes corrosion. To solve this problem, JP-A 2011-105782 (Patent Document 3) has proposed a silicone rubber composition suitable for use as a key pad having excellent dynamic fatigue durability, in which an organodisilazane having an alkenyl group in the molecule and a fatty acid ester and/or a fatty alcohol ester is used. However, the organodisilazane having an alkenyl group in the molecule is expensive, thus being poor in economy. Further, the use of the organodisilazane is unfavorable in that the nitrogen-containing compounds derived from the unreacted organodisilazane and the resulting reaction side product serve as a catalytic poison, so that addition vulcanization is disenabled, or a cured product undergoes yellowing.

CITATION LIST

Patent Document 1: JP-A 2001-164111
Patent Document 2: JP-A 2009-275158
Patent Document 3: JP-A 2011-105782

SUMMARY OF THE INVENTION

It is an object of the present invention to provide a silicone rubber composition suited for use as a key pad having excellent dynamic fatigue durability (keying durability) and a silicone rubber key pad obtained by curing molding of the composition.

The present inventors have made intensive studies so as to achieve the above object and, as a result, found that a key pad material having excellent dynamic fatigue durability can be obtained by curing a silicone rubber composition including an organopolysiloxane having a degree of polymerization of at least 100, a reinforcing silica, an vinyl group-containing alkoxysilane, hydrochloric acid, and a fatty acid ester and/or a fatty alcohol ester, thereby arriving at completion of the present invention.

More particularly, although the mechanism of the effect of the present invention is not known yet, it is assumed that when a base compound of a silicone rubber composition is prepared while performing the surface treatment of silica (a reinforcing silica), particularly silica not undergoing a surface treatment, in a condition where it co-exists with a vinyl group-containing alkoxysilane and hydrochloric acid, the silica is more uniformly dispersed and the vinyl group on the treated surface is involved in the crosslinkage upon curing of the silicone rubber composition. Moreover, when a fatty acid ester and/or a fatty alcohol ester is added in a given amount, the dynamic fatigue durability (keying durability) could be made more excellent while keeping good mechanical characteristics of the resulting silicone rubber cured product.

Accordingly, the present invention provides, as recited below, a silicone rubber composition for making a key pad and a key pad made of a cured molding of the composition.

There is provided a silicone rubber composition for making a key pad including:

(A) 100 parts by weight of an organopolysiloxane represented by the following average compositional formula (1):

$$R^1{}_n SiO_{(4-n)/2} \qquad (1)$$

wherein $R^1$ is each independently the same or different and are an unsubstituted or substituted monovalent hydrocarbon group, and letter n is a positive number of 1.95 to 2.04, and having at least two alkenyl groups in one molecule;

(B) 10 to 100 parts by weight of reinforcing silica having a specific surface area of at least 50 $m^2/g$ when determined by BET method;

(C) 0.1 to 10 parts by weight of a vinyl group-containing alkoxysilane;

(D) 0.0001 to 0.2 part by weight of hydrochloric acid, calculated as hydrogen chloride in hydrochloric acid;

(E) 0.01 to 5 parts by weight of a fatty acid ester and/or a fatty alcohol ester; and (F) an effective amount of a curing agent.

Preferably, the reinforcing silica of component (B) is untreated silica.

Preferably, the curing agent of component (F) is a combination of an organohydrogenpolysiloxane and a hydrosilylation catalyst, or an organic peroxide.

There is also provided a key pad made of a cured molding of the silicone rubber composition recited above.

Advantageous Effects of the Invention

According to the present invention, there can be obtained a silicone rubber composition suited as a key pad showing good results in a keying durability test, and a silicone rubber key pad obtained by curing molding of the composition.

BRIEF DESCRIPTION OF THE DRAWINGS

FIG. 2 is a click pattern of a key pad of the present invention.

DESCRIPTION OF THE PREFERRED EMBODIMENT

Figure 1:
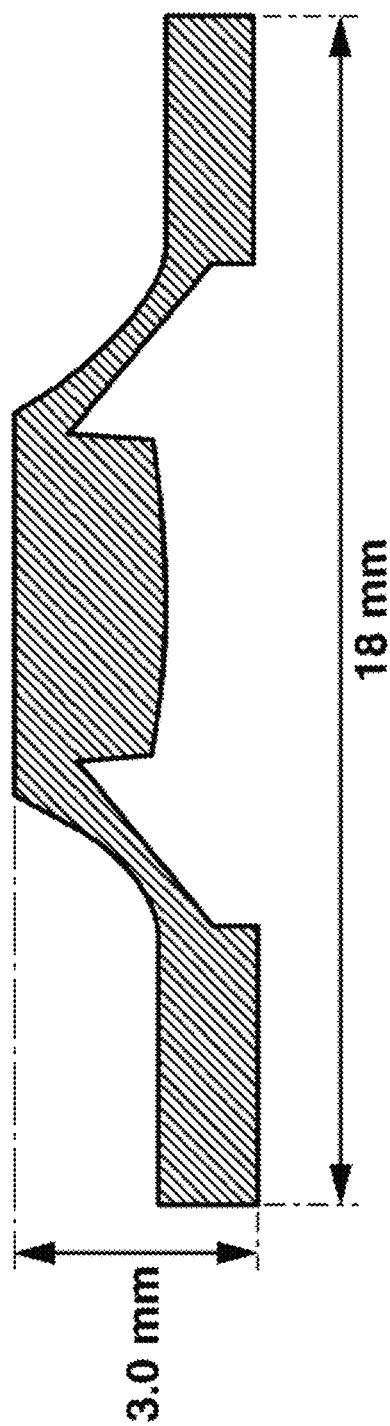
FIG. 1 is a side view of a key pad according to the present invention.

The present invention is now described in more detail.
(A) Organopolysiloxane

The organopolysiloxane of component (A) is a main agent (base polymer) of the present composition, is represented by the following average compositional formula (1), and contains at least two silicon atom-bonded alkenyl groups in one molecule:

$$R^1{}_n SiO_{(4-n)/2} \tag{1}$$

wherein $R^1$ is each independently the same or different and represent an unsubstituted or substituted monovalent hydrocarbon group, and letter n is a positive number of 1.95 to 2.04.

In the above average compositional formula (1), $R^1$ is generally a hydrocarbon group having 1 to 20 carbon atoms, preferably 1 to 12 carbon atoms, and more preferably 1 to 8 carbon atoms. The monovalent hydrocarbon group represented by $R^1$ includes, for example, alkyl group such as methyl group, ethyl group, propyl group or butyl group, cycloalkyl group such as cyclohexyl group, alkenyl group such as vinyl group, allyl group, butenyl group or hexenyl group, aryl group such as phenyl group or tolyl group, aralkyl group such as 0-phenylpropyl group, or chloromethyl group, trifluoropropyl group or cyanoethyl group wherein one or more of the hydrogen atoms bonded to the carbon atoms of these groups are substituted with halogen atom, cyano group or the like. Of these, methyl group, vinyl group, phenyl group and trifluoropropyl group are preferred. More preferably, methyl group and vinyl group are mentioned. Especially, the monovalent hydrocarbon group represented by $R^1$ in the molecule should preferably be at least 50 mol % of methyl group and more preferably at least 80 mol % of methyl group, and is much more preferably such that all $R^1$ other than alkenyl group are methyl group.

In the above average compositional formula (1), letter n is a positive number of 1.95 to 2.04, preferably 1.98 to 2.02. If the value of letter n is not within a range of 1.95 to 2.04, the resulting cured product does no always show satisfactory rubber elasticity.

The organopolysiloxane of component (A) should have at least two alkenyl groups in one molecule. In formula (1), it is preferred that 0.001 to 10 mol %, preferably 0.01 to 5 mol %, of $R^1$ is an alkenyl group. The alkenyl group preferably includes a vinyl group and an allyl group, of which a vinyl group is more preferred.

The degree of polymerization of the organopolysiloxane serving as component (A) is at least 100 (usually, 100 to 100,000), preferably within a range of 1,000 to 100,000, more preferably within a range of 3,000 to 50,000 and most preferably within a range of 4,000 to 20,000. It will be noted that the degree of polymerization is obtained as a weight average degree of polymerization, calculated as polystyrene, according to gel permeation chromatography (GPC) analysis.

It is to be noted that the weight average molecular weight referred to in the present invention means a weight average molecular weight measured under the following conditions according to the GPC using polystyrene as a standard substance.

Measuring Conditions
Developing solvent: toluene
Flow rate: 1 mL/minute
Detector: differential refractive index detector (RI)
Column: two KF-805L columns (Shodex Inc.)
Column temperature: 25° C.
Sample injection amount: 30 μL (toluene solution having a concentration of 0.2 wt %)

The organopolysiloxane of component (A) is not specifically limited in type so far as the above requirements are satisfied. In usual practice, it is preferred to use a linear diorganopolysiloxane wherein the main chain consists of repetitions of a diorganosiloxane unit ($R^1{}_2SiO_{2/2}$) wherein $R^1$ has the same meaning as defined above herein and whenever it appears hereinafter) and both ends of the molecular chain are blocked with a triorganosiloxy group ($R^1{}_3SiO_{1/2}$). The both ends of the molecular chain should preferably be blocked with a trimethylsiloxy group, a dimethylvinylsiloxy group, a dimethylhydroxysiloxy group, a methyldivinylsiloxy group, a trivinylsiloxy group or the like. Especially, the ends, which are each blocked with a siloxy group having at least one vinyl group, are preferred. These organopolysiloxanes may be used singly or in combination of at least two having different degrees of polymerization and different molecular structures.

(B) Reinforcing Silica

The reinforcing silica of component (B) acts as a component which is able to impart excellent mechanical characteristics to the resulting silicone rubber composition. The reinforcing silica may be either precipitated silica (wet silica) or fumed silica (dry silica) wherein a multitude of silanol groups (SiOH) exist on the surface. In the practice of the present invention, when determined by BET method, the specific surface area of the reinforcing silica of component (B) should be at least 50 m²/g, preferably from 100 to 400 m²/g. If the specific surface area is less than 50 m²/g, the reinforcing effect of component (B) Becomes Inadequate.

The reinforcing silica of component (B) may be used in an untreated state, or may be used after surface treatment with an organosilicon compound such as an organopolysiloxane, an organopolysilazane, a chlorosilane or an alkoxysilane. The use of the untreated silica is preferred because good dispersability of the reinforcing silica is ensured on use in combination with components (C) and (D) described hereinafter and keying durability is more improved when the composition of the present invention is used for application to key pads. These reinforcing silicas may be used singly or in combination of at least two kinds.

The amount of the reinforcing silica of component (B) ranges from 10 to 100 parts by weight, preferably from 10 to 80 parts by weight, more preferably from 20 to 70 parts by weight, per 100 parts by weight of the organopolysiloxane of component (A). If the amount is outside the above range, not only the resulting silicone rubber composition lowers in processability, but also the silicone rubber cured product obtained by curing the silicone rubber composition becomes unsatisfactory with respect to the mechanical characteristics, such as tensile strength and tearing strength.

(C) Vinyl Group-Containing Alkoxysilane

The vinyl group-containing alkoxysilane of component (C) acts as a crosslinking point between the organopolysiloxane and silica in the silicone rubber composition of the present invention. The vinyl group-containing alkoxysilane is not specifically limited and conveniently includes vinyl triethoxysilane, vinyl trimethoxysilane, divinyl dimethoxysilane and vinyl tris(methoxyethoxy)silane.

The amount of the vinyl group-containing alkoxysilane of component (C) is from 0.1 to 10 parts by weight, preferably from 0.1 to 3 parts by weight and more preferably from 0.1 to 1 part by weight, per 100 parts by weight of the organopolysiloxane of component (A). If the amount of component (C) is less than 0.1 part by weight, the effect of improving the dynamic fatigue durability of the resulting silicone cured product may not be obtained. On the other hand, if over the above range, the resulting rubber becomes too high in hardness and may not good in economy.

(D) Hydrochloric Acid

The hydrochloric acid of component (D) acts as a dispersability improver of silica in the silicone rubber composition of the present invention. The concentration of hydrochloric acid used as component (D) is preferably from 0.05 to 5 N, more preferably from 0.05 to 2 N. If the concentration of hydrochloric acid is less than 0.05 N, an amount of hydrochloric acid to be added undesirably increases. On the other hand, when the hydrochloric acid concentration exceeds 2 N, its handling becomes dangerous with some concern that the device used for formulating the respective components may be corroded.

The amount of component (D), calculated as hydrogen chloride in hydrochloric acid, is from 0.0001 to 0.2 part by weight, preferably from 0.0001 to 0.1 part by weight, more preferably from 0.0001 to 0.05 parts by weight, per 100 parts by weight of the organopolysiloxane of component (A). If the amount of hydrochloric acid is too small, the effect of improving dynamic fatigue durability may not be obtained. If a larger amount of hydrochloric acid is added, excess water has to be removed.

(E) Fatty Acid Ester and/or Fatty Alcohol Ester

Component (E) is a fatty acid ester and/or a fatty alcohol ester and serves in the silicone rubber composition of the present invention as a dynamic fatigue durability improver and also as a mold releasability improver of a silicone rubber cured product. Examples of the fatty acid ester include ester compounds of a variety of fatty acids including C4 to C9 lower saturated fatty acids such as butyric acid, caproic acid, enanthic acid, caprylic acid and pelargonic acid, C10 to C20 higher saturated fatty acids such as capric acid, undecanoic acid, lauric acid, myristic acid, palmitic acid and stearic acid, unsaturated fatty acids such as myristoleic acid, oleic acid and linoleic acid, and fatty acids having an OH group such as ricinoleic acid, particularly, those ester compounds with lower alcohols (e.g. lower alcohols having approximately 1 to 6 carbon atoms, such as methanol and ethanol) and also those ester compounds with polyhydric alcohols such as sorbitan esters and glycerine esters.

Examples of the fatty alcohol ester include dibasic acid esters such as glutaric acid esters and suberic acid esters and tribasic acid esters such as citric acid esters, both of fatty alcohols including saturated alcohols such as caprylyl alcohol, capryl alcohol, lauryl alcohol, myristyl alcohol and stearyl alcohol, and unsaturated alcohols such as oleyl alcohol, linoleyl alcohol and linoleic alcohol.

The amount of component (E) is from 0.01 to 5 parts by weight, preferably from 0.05 to 3 parts by weight, per 100 parts by weight of the organopolysiloxane of component (A). If the amount of component (E) is below the range, the mold releasability of a silicone rubber cured product may not be improved. If over the range, there occurs the discoloration of a silicone rubber cured product, the deterioration of characteristics such as compression permanent strain or the deterioration of plastic return, which is not good in economy.

(F) Curing Agent

The curing agent (F) is not specifically limited so far as it is able to cure component (A). For example, the following addition reaction curing agent (F-1) and/or organic peroxide curing agent (F-2) is mentioned. More particularly, these curing agents react with the organopolysiloxane of component (A) in the silicone rubber composition of the present invention to form a crosslinked structure thereby giving a cured product.

Addition Reaction Curing Agent (F-1)

A combination of an organohydrogenpolysiloxane and a hydrosilylation catalyst may be used as the addition reaction curing agent (F-1).

The organohydrogenpolysiloxane may be any of linear, cyclic and branched ones provided that it contains at least two, preferably at least 3, more preferably 3 to 200 and much more preferably approximately 4 to 100 SiH groups in one molecule. Known organohydrogenpolysiloxanes may be used as a crosslinking agent of the addition reaction curing-type silicone rubber composition. For example, an organohydrogenpolysiloxane represented by the following average compositional formula (2) may be used:

$$R^2_p H_q SiO_{(4-p-q)/2} \qquad (2)$$

In the above average compositional formula (2), $R^2$ represent an unsubstituted or substituted monovalent hydrocarbon group and may be the same or different, and are preferably one wherein an aliphatic unsaturated bond is excluded. $R^2$ is a group having 1 to 12 carbon atoms, preferably 1 to 8 carbon atoms. Specific examples include an alkyl group such as a methyl group, an ethyl group or a propyl group, a cycloalkyl group such as a cyclohexyl group, an aryl group such as a phenyl group or a tolyl group, an aralkyl group such as a benzyl group, a 2-phenylethyl group or a 2-phenylpropyl group, and a group wherein one or more of the hydrogen atoms of these groups are substituted with a halogen atom or the like, for instance, 3,3,3-trifluoropropyl group. In the above average compositional formula (2), p and q are each such a positive number that satisfies $0 \leq p < 3$, preferably $1 \leq p \leq 2.2$, $0 < q \leq 3$, preferably $0.002 \leq q \leq 1$, and $0 < p+q \leq 3$, preferably $1.002 \leq p+q \leq 3$.

The organohydrogenpolysiloxane has at least two SiH groups, preferably at least three SiH groups, in one molecule. This group may be located at the end of a molecular chain, in the middle of a molecular chain, or at both. The viscosity of the organohydrogenpolysiloxane at 25° C. ranges from 0.5 to 10,000 mPa·second, preferably from 1 to 300 mPa·second.

Specific examples of the organohydrogenpolysiloxane include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane/dimethylsiloxane cyclic copolymer, methylhydrogenpolysiloxane having both ends blocked with a trimethylsiloxy group, dimethylsiloxane/methylhydrogensiloxane copolymer having both ends blocked with a trimethylsiloxy group, dimethylpolysiloxane having both ends blocked with a dimethylhydrogensiloxy group, dimethylsiloxane/methylhydrogensiloxane copolymer having both ends blocked with a dimethylhydrogensiloxy group, methylhydrogensiloxane/diphenylsiloxane copolymer having both ends blocked with a trimethylsiloxy group, methylhydrogensiloxane/diphenylsiloxane/dimethylsiloxane copolymer having both ends blocked with a trimethylsiloxy group, methylhydrogensiloxane/methylphenylsiloxane/dimethylsiloxane copolymer having both ends blocked with a trimethylsiloxy group, methylhydrogensiloxane/dimethylsiloxane/diphenylsiloxane copolymer having both ends blocked with a dimethylhydrogensiloxy group, methylhydrogensiloxane/dimethylsiloxane/methylphenylsiloxane copolymer having both ends blocked with a dimethylhydrogensiloxy group, copolymer including $(CH_3)_2HSiO_{1/2}$ units, $(CH_3)_3SiO_{1/2}$ units and $SiO_{4/2}$ units, copolymer including $(CH_3)_2HSiO_{1/2}$ units and $SiO_{4/2}$ units, copolymer including $(CH_3)_2HSiO_{1/2}$ units, $SiO_{4/2}$ units and $(C_6H_5)_3SiO_{1/2}$ units, those compounds wherein one or more of the methyl groups in the above-exemplified compounds are substituted with other alkyl group, a phenyl group or the like, and the compounds of the following structural formulae:

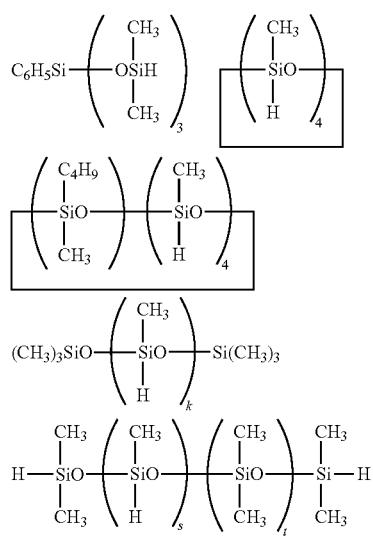

wherein letter k is an integer of 2 to 10, and letters s and t are each an integer of 0 to 10.

The amount of the organohydrogenpolysiloxane is from 0.1 to 40 parts by weight, preferably from 0.3 to 20 parts by weight, per 100 parts by weight of the organopolysiloxane of component (A).

The organohydrogenpolysiloxane is preferably formulated in such a way that the molar ratio of the hydrogen atoms bonded to the silicon atoms (i.e. SiH groups) in the organohydrogenpolysiloxane to aliphatic unsaturated groups bonded to the silicon atoms in component (A), such as an alkenyl group and a diene group, is from 0.5 to 10 mols/mol, more preferably 0.7 to 5 mols/mol. If less than 0.5 moss/mol, crosslinkage does not proceed satisfactorily with the possibility that adequate mechanical strength may not be obtained. If over 10 mols/mol, physical characteristics after curing lower with some case that a heat resistance and a compression permanent strain become worsened.

The hydrosilylation catalyst is one that permits addition reaction between the alkenyl group of component (A) and the silicon atom-bonded hydrogen atom (SiH group) of the organohydrogenpolysiloxane.

Examples of the hydrosilylation catalyst include platinum group metal catalysts having simple metals of the platinum group and compounds thereof, for which there may be used ones hitherto known as a catalyst for addition reaction curing type silicone rubber compositions. Examples include particulate platinum metal, absorbed on a carrier such as silica, alumina or silica gel, an alcohol solution of platinum chloride, chloroplatinic acid or chloroplatinic acid hexahydrate, a palladium catalyst and a rhodium catalyst. Of these, platinum and platinum compounds are preferred.

The amount of the hydrosilylation catalyst may be one sufficient to enable the addition reaction to proceed. In general, when calculated as a platinum group metal, the amount used is within a range of from 1 weight ppm to 1 wt %, preferably from 10 to 500 weight ppm, relative to the organopolysiloxane of component (A). If the amount is less than 1 weight ppm, there are some cases that the addition reaction does not satisfactorily proceed and curing becomes insufficient. On the other hand, when the amount exceeds 1 wt %, a surplus amount gives only a less significant influence on the reactivity with the possibility that the economy may become poor.

(F-2) Organic Peroxide Curing Agent

The organic peroxide curing agent (F-2) includes, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(t-butyl peroxy) hexane, di-t-butyl peroxide, t-butyl perbenzoate or 1,6-hexanediol-bis-t-butyl peroxycarbonate.

The amount of the organic peroxide is from 0.1 to 10 parts by weight, preferably from 0.2 to 5 parts by weight, per 100 parts by weight of the organopolysiloxane of component (A). If the amount is below the range, the curing of the silicone rubber composition may become insufficient. On the other hand, when the amount is over the range, the silicone rubber cured product may undergo yellowing by the action of decomposition residue of the organic peroxide.

It will be noted that when component (F-1) and component (F-2) are formulated in component (A) in combination within the respective ranges of the amount as indicated above, there may be provided a silicone rubber composition of a co-vulcanization type wherein addition reaction curing and organic peroxide curing are used in combination.

Other Optional Components

If necessary, the silicone rubber composition of the present invention may further include, aside from the above-described components, non-reinforcing silicas such as quartz powder, crystalline silica, diatomaceous earth and calcium carbonate, carbon blacks such as acetylene black, furnace black and channel black, colorants, heat-resistance improvers such as colcothar and cerium oxide, platinum, titanium oxide, flame retardancy improvers such as a triazole compound, acid-receiving agents, thermal conductivity improvers such as alumina and boron nitride, release agents, and dimethylpolysiloxanes having a silanol group at both ends thereof.

The silicone rubber composition of the present invention may be obtained by uniformly mixing the above components by the use of a mixing apparatus such as a two roll mill, a Banbury mixer or a Dow mixer (kneader). It is preferred that after mixing of components (A), (B), (C), (D) and (E), component (F) is further formulated.

The silicone rubber composition of the present invention is used for a key pad. For forming such a key pad, the silicone rubber composition is molded simultaneously with thermal curing, by which there can be obtained a molding made of a rubbery elastomer (silicone rubber cured product).

Although the manner of curing the silicone rubber composition is not specifically limited, there may be adopted a method wherein adequate heat is applied for the decomposition of the above-indicated curing agent and also for the vulcanization of the silicone rubber composition. The curing temperature conditions are generally in the range of 80° C. to 400° C. although depending on the manner of curing. The molding method is not specifically limited and such a molding method may be adopted including continuous vulcanization extrusion molding, press molding (pressure molding) or injection molding. Moreover, secondary vulcanization approximately at 150° C. to 250° C. for one to ten hours may be performed, if necessary.

EXAMPLES

Examples and Comparative Examples are shown to more particularly illustrate the present invention, which should not be construed as limited to the following Examples. The method of measuring physical characteristics and the methods of testing dynamic fatigue are described below.
Physical Characteristics Measurement Method A silicone rubber composition was cured under conditions of 165° C. and ten minutes, and hardness (Durometer A) and tensile strength were measured according to JIS K6249: 2003.
Dynamic Fatigue Durability Test Method Dynamic fatigue durability was measured according to the following methods.
[Keying Test Method]

A silicone rubber composition was press molded by use of a mold to provide a molded key shaped as shown in FIG. 1. This molded key was fixed and a load of 1,200 g was applied from above, followed by keying at a rate of three per second.
[Method of Measuring a Load of Molded Key]

Using a load measuring instrument (MODEL-1305-DS, manufactured by Aikoh Engineering Co., Ltd.), a load of key was measured. When a key was pushed down for displacement, such a click pattern as shown in FIG. 2 was usually obtained. F1 of the click pattern was measured as a peak load.
[Method of Evaluating the Keying Fatigue Durability of Molded Key]

Using the above keying test method, the peak load variation approximately at 200,000 keying strokes was obtained by the following equation:

Peak load variation (%)=[F1 value prior to keying test−F1 value after keying test]/F1 value prior to keying test]×100

Example 1

60 parts by weight of a linear organopolysiloxane (raw rubber) including 99.850 mol % of dimethylsiloxane units used as diorganosiloxane units serving as a main chain, 0.125 mol % of methylvinylsiloxane units, and 0.025 mol % of a dimethylvinylsiloxy group provided as an end group of the molecular chain and having an average degree of polymerization of approximately 6,000, 40 parts by weight of a linear organopolysiloxane (raw rubber) including 99.475 mol % of dimethylsiloxane units used as diorganosiloxane units serving as a main chain, 0.50 mol % of methylvinylsiloxane units, and 0.025 mol % of a dimethylvinylsiloxy group provided as an end group of the molecular chain and having an average degree of polymerization of approximately 6,000, 32 parts by weight of fumed silica (manufactured by Nippon Aerosil Co., Ltd., available under the commercial name of "Aerosil 300") having a specific surface area of 300 m²/g when determined by a BET method, 6 parts by weight of a dimethylpolysiloxane serving as a dispersant having a silanol group at both ends thereof, an average degree of polymerization of 15 and a viscosity of 30 mPa·second at 25° C., 1 part by weight of vinyltrimethoxysilane, and 0.1 part by weight of 1 N hydrochloric acid were kneaded by means of a kneader and subjected to thermal treatment at 170° C. for two hours to prepare compound 1'. 0.4 parts by weight of a citric acid ester of a fatty alcohol having 13 carbon atoms ("KAOWAX 220," manufactured by Kao Corporation) was added to 100 parts by weight of the compound 1' thereby obtaining "Compound I."

0.4 parts by weight of 2,5-dimethyl-2,5-bis(t-butylperoxy)hexane serving as a crosslinking agent was added to 100 parts by weight of "Compound I" and uniformly mixed, followed by press curing under conditions of 165° C. and 70 kgf/cm² for ten minutes and post curing at 200° C. for four hours to obtain a test sheet. This sheet was subjected to measurement by the tests of the physical characteristic and the dynamic fatigue durability, with the results shown in Table 1.

Example 2

A test sheet was made in the same manner as in Example 1 except that the amount of vinyltrimethoxysilane (corresponding to component (C) of the present invention) was changed to 1.5 parts by weight. The results of measurement of the physical characteristics and dynamic fatigue durability tests are shown in Table 1.

Example 3

A test sheet was made in the same manner as in Example 1 except that a glycerine ester of ricinoleic acid ("KAOWAX 85P," manufactured by Kao Corporation and corresponding to component (E) of the present invention) was used instead of a citric acid ester of a fatty alcohol having 13 carbon atoms ("KAOWAX 220," manufactured by Kao Corporation and corresponding to component (E) of the present invention). The results of measurement of the physical characteristics and dynamic fatigue durability tests are shown in Table 1.

Example 4

A test sheet was made in the same manner as in Example 1 except that 0.5 parts by weight/2.0 parts by weight of C-25A (platinum catalyst)/C-25B (organohydrogenpolysiloxane) (both manufactured by Shin-Etsu Chemical Co., Ltd. and corresponding to component (F) of the present invention) were added as a crosslinking agent in place of 2,5-dimethyl-2,5-bis(t-butylperoxy)hexane and uniformly mixed, followed by press curing under conditions of 120° C. and 70 kgf/cm² for ten minutes and post curing at 200° C.

for four hours. The results of measurement of the physical characteristics and dynamic fatigue durability tests are shown in Table 1.

Comparative Example 1

A test sheet was made in the same manner as in Example 1 except that vinyltrimethoxysilane corresponding to component (C) of the present invention was not added. The results of measurement of the physical characteristics and dynamic fatigue durability tests are shown in Table 1.

Comparative Example 2

A test sheet was made in the same manner as in Example 1 except that 1 N hydrochloric acid corresponding to component (D) of the present invention was not added. The results of measurement of the physical characteristics and dynamic fatigue durability tests are shown in Table 1.

Comparative Example 3

A test sheet was made in the same manner as in Example 1 except that a citric acid ester of a fatty alcohol having 13 carbon atoms corresponding to component (E) of the present invention ("KAOWAX 220," manufactured by Kao Corporation) was not added. The results of measurement of the physical characteristics and dynamic fatigue durability tests are shown in Table 1.

TABLE 1

|  | Example | | | | Comparative Example | | |
| --- | --- | --- | --- | --- | --- | --- | --- |
|  | 1 | 2 | 3 | 4 | 1 | 2 | 3 |
| Hardness (Durometer A) | 67 | 69 | 66 | 65 | 65 | 67 | 70 |
| Tensile strength (MPa) | 8.2 | 7.8 | 7.9 | 8.6 | 8.5 | 8.1 | 7.2 |
| Peak Load (g) | 680 | 695 | 675 | 670 | 670 | 675 | 685 |
| Variation in peak load after 200,000 keying strokes (%) (initial value = 100) | 82.1 | 80.2 | 81.9 | 81.2 | 70.0 | 69.3 | key breakage |

Japanese Patent Application No. 2016-112644 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone rubber composition for making a key pad comprising:

(A) 100 parts by weight of an organopolysiloxane represented by the following average compositional formula (1):

$$R^1{}_n SiO_{(4-n)/2} \qquad (1)$$

wherein $R^1$ is each independently the same or different and are an unsubstituted or substituted monovalent hydrocarbon group, and letter n is a positive number of 1.95 to 2.04, and having at least two alkenyl groups in one molecule;

(B) 10 to 100 parts by weight of reinforcing silica having a specific surface area of at least 50 m²/g when determined by BET method;

(C) 0.1 to 10 parts by weight of a vinyl group-containing alkoxysilane;

(D) 0.0001 to 0.2 part by weight of hydrochloric acid, calculated as hydrogen chloride in hydrochloric acid;

(E) 0.01 to 5 parts by weight of a fatty acid ester and/or a fatty alcohol ester; and (F) an effective amount of a curing agent.

2. The silicone rubber composition of claim 1, wherein the reinforcing silica of component (B) is untreated silica.

3. The silicone rubber composition of claim 1, wherein the curing agent of component (F) is a combination of an organohydrogenpolysiloxane and a hydrosilylation catalyst, or an organic peroxide.

4. A key pad made of a cured molding of the silicone rubber composition defined in claim 1.

* * * * *